US012055079B2

(12) United States Patent
Conrad et al.

(10) Patent No.: US 12,055,079 B2
(45) Date of Patent: Aug. 6, 2024

(54) SUCTION DEVICE

(71) Applicant: MAHLE International GmbH

(72) Inventors: Holger Conrad, Veilsdorf (DE); Anna Eichner, Grunbach (DE); Hans-Martin Ruppert, Ostfildren (DE); Andreas Widmaier, Herrenberg (DE); Patrick Wieler, Schorndorf (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 17/972,578

(22) Filed: Oct. 24, 2022

(65) Prior Publication Data
US 2023/0128393 A1 Apr. 27, 2023

(30) Foreign Application Priority Data
Oct. 26, 2021 (DE) ..................... 10 2021 212 083.0

(51) Int. Cl.
*F01M 11/06* (2006.01)
*F01M 11/00* (2006.01)
*F16K 17/36* (2006.01)

(52) U.S. Cl.
CPC ......... *F01M 11/064* (2013.01); *F16K 17/366* (2013.01); *F01M 2011/0075* (2013.01)

(58) Field of Classification Search
CPC .. F01M 11/062; F01M 11/064; F01M 11/065; F01M 2011/007; F01M 2011/0075; F16K 17/366
See application file for complete search history.

(56) References Cited

U.S. PATENT DOCUMENTS 562,267 A * 6/1896 Albin ................... F04B 39/1033
137/546
1,866,280 A * 7/1932 Woolson ............... F01M 11/065
184/6.2

(Continued)

FOREIGN PATENT DOCUMENTS

| DE | 2339730 A1 * | 2/1974 | ............. F01M 1/065 |
| DE | 102007034488 A1 | 1/2009 | |
| JP | 58093911 A | 6/1983 | |

OTHER PUBLICATIONS

Amazon.com Bacoeng 1 NPT PVC Foot Valves, Aug. 11, 2020, p. 5.*

(Continued)

*Primary Examiner* — Minh Truong
(74) *Attorney, Agent, or Firm* — Fishman Stewart PLLC

(57) ABSTRACT

A suction device may include a suction channel, a first valve, and a second valve. The suction channel may include a first suction portion and a second suction portion disposed opposite one another in a transverse direction. The first valve may be arranged in the first suction portion. The first valve may include a first valve seat and a moveable first valve body. The second valve may be arranged in the second suction portion. The second valve may include a second valve seat and a moveable second valve body. When a transverse acceleration is equal to or greater than a predefined transverse acceleration, one of the first valve and the second valve may close while the other one of the first valve and the second valve remains open. When the transverse acceleration is less than the predefined transverse acceleration, the first valve and the second valve may both be open.

20 Claims, 1 Drawing Sheet

(56) References Cited

U.S. PATENT DOCUMENTS

Figure 1:
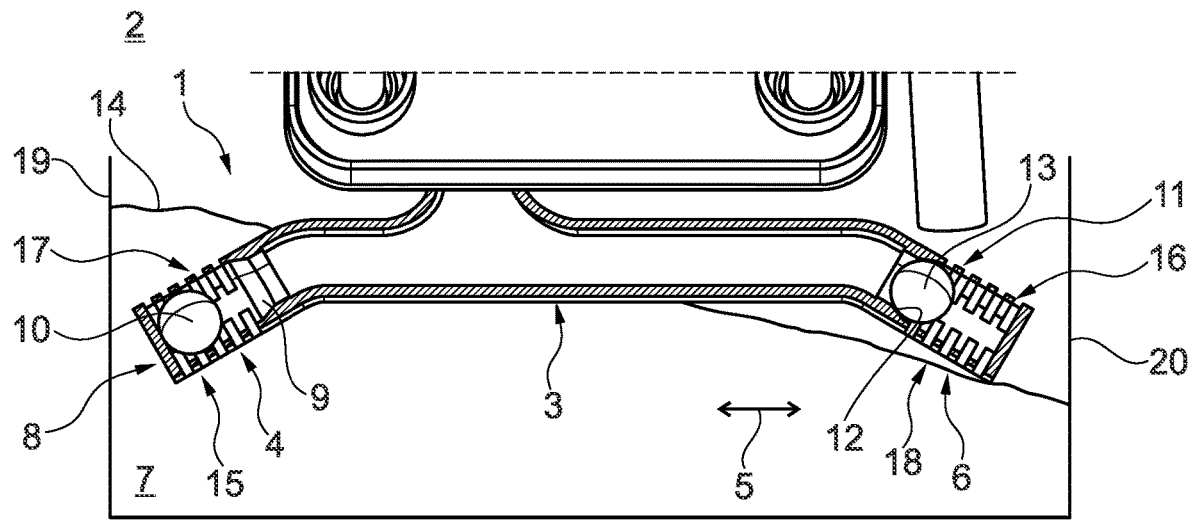

| | | | | |
|---|---|---|---|---|
| 2,239,098 | A | * | 4/1941 | Hunter .................. B64D 37/22 |
| | | | | 222/487 |
| 4,899,773 | A | * | 2/1990 | Harrison ............... F16K 17/366 |
| | | | | 244/135 R |
| 6,260,534 | B1 | * | 7/2001 | Kampichler ........... F01M 11/03 |
| | | | | 123/196 R |
| 2004/0020530 | A1 | * | 2/2004 | Lai ........................ F16K 17/366 |
| | | | | 137/38 |
| 2018/0106357 | A1 | * | 4/2018 | Kawakami .......... F16H 57/0423 |
| 2019/0323642 | A1 | * | 10/2019 | Kiyokami ............. B29C 66/547 |
| 2021/0277812 | A1 | * | 9/2021 | Smith .................... F01M 11/02 |

OTHER PUBLICATIONS

Cage definition and meaning Collins English Dictionary, Jan. 2, 2024, p. 4.*
English abstract for JP-58093911.
German Search Report for 102021212083.0, dated Sep. 14, 2022.

* cited by examiner

SUCTION DEVICE

CROSS-REFERENCE TO RELATED APPLICATIONS

This application claims priority to German Patent Application No. DE 10 2021 212 083.0, filed on Oct. 26, 2021, the contents of which is hereby incorporated by reference in its entirety.

TECHNICAL FIELD

The present invention relates to suction device, in particular for suctioning oil, having a suction channel. In addition, the invention relates to a motor vehicle having such a suction device.

BACKGROUND

In order to be able to reliably lubricate for example internal combustion engines in all operating states a continuous uninterrupted oil supply is mandatory. With the motor vehicle in drive mode however it can happen on account of negotiating a curve that a suction of oil cannot be or only insufficiently ensured, which in the worst case can result in damage to the internal combustion engine. For this reason, for example a suction nozzle for the oil suctioning is often routed as far as to the deepest point of an oil reservoir, as a result of which however uninterrupted suctioning of oil is nevertheless not always possible.

SUMMARY

The present invention therefore deals with the object of stating for a suction device of the generic type an improved or at least an alternative embodiment which in particular overcomes the disadvantages known from the prior art.

According to the invention, this problem is solved through the subject matter of the independent claim(s). Advantageous embodiments are the subject matter of the dependent claim(s).

The present invention is based on the general idea of configuring a suction channel of a suction device, for example of a suction device for suctioning oil so that via the same a reliable continuous suctioning of liquid, for example of oil, is ensured even during high transverse accelerations or large transverse inclinations and unintentional suctioning of air can be prevented. Here, the suction channel comprises a first suction portion and a second suction portion that is separate from and located opposite the former in the transverse direction, wherein the suction device in the mounted state projects, via its two suction portions, into a liquid reservoir. In the first suction portion a first valve having a first valve seat and a moveable first valve body interacting with the same is provided, wherein in the second suction portion a second valve having a second valve seat and a moveable second valve body interacting with the same is provided. The two valves are designed in such a manner that from a predefined transverse acceleration $a \geq a_D$, i.e. for example from a certain curve negotiation or a certain transverse inclination, one of the two valves closes while the other valve remains open. Below this predefined transverse acceleration, i.e. at $a < a_D$, both valves remain open. In a state installed in a motor vehicle for example the two suction portions of the suction device are oriented in the transverse direction and project in each case on the outside into a corresponding oil sump. With the suction device according to the invention it can thus be achieved that in the case of a motor vehicle that is stationary or travelling free of transverse acceleration, both valves are open and a suctioning of liquid or oil takes place via both suction portions of the suction channel. However, when the motor vehicle negotiates a curve and in the process the transverse acceleration occurring then exceeds the predefined transverse acceleration $a \geq a_D$, the valve located inside in the transverse direction closes, while the outer valve remains open. This offers the major advantage that a suction via the outer valve, for example the second valve, can continue free of air since the liquid due to the centrifugal force, or due to the transverse acceleration, is likewise moved to the outside. When the motor vehicle enters a curve directed in the opposite direction, the liquid in the liquid reservoir, for example an oil pan, again moves to the outside, wherein the inner valve, in this case then the second valve, closes again and the outer valve, i.e. in this case the first valve, opens. In this state, a suctioning of liquid, for example oil, free of air is also possible.

In an advantageous further development of the suction device according to the invention, the first and/or the second valve body are/is a sphere. In this case, the associated valve seat is formed as a spherical segment surface, wherein such a spherical valve body places significantly lower requirements on fits or tolerances and at the same time offers a greater acceptance of dirt accumulation.

In a further advantageous embodiment of the suction device according to the invention, a first guiding cage for guiding the first valve body and/or for pre-filtering a liquid, for example oil, to be suctioned is arranged on the first valve. Additionally or alternatively, a second guide cage for guiding the second valve body and for pre-filtering a liquid, for example oil to be suctioned is analogously also arranged on the second valve. Thus, the guide cage fulfils two tasks simultaneously, namely on the one hand guiding the valve body, for example, the sphere, and on the other hand at least a minor pre-filtering of the liquid, for example of the oil, to be suctioned.

Practically, the suction channel is formed in one piece with the first suction portion and the second suction portion, for example as plastic injection moulding. By way of this, a comparatively simple prefabrication of the suction channel is possible. Purely theoretically it is obviously also conceivable that the suction channel is formed from metal. When using plastics it merely has to be ensured that these are resistant to the liquid to be suctioned. Here, the guide cage can be configured so as to be removeable in order to for example arrange the valve body therein. Purely theoretically it is also conceivable that the suction channel with the two suction portions and the two guide cages is formed by two, in each case, one-piece half shells, which in turn can be formed as plastic injection mouldings. Prior to assembling the two half shells, for example a welding together, the two valve bodies still have to be inserted.

Further, the present invention is based on the general idea of equipping a motor vehicle with such a suction device and by way of this transfer the advantages mentioned previously with respect to the suction device to the motor vehicle. Specifically, this is in particular a reliable oil supply regardless of transverse acceleration.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

A preferred exemplary embodiment of the invention is shown in the drawings and is explained in more detail in the following description, wherein same reference numbers relate to same or similar or functionally same components.

DETAILED DESCRIPTION OF THE DRAWINGS

Figure 2:
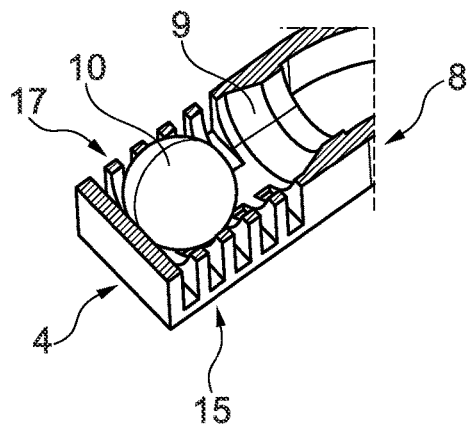
Figure 3:
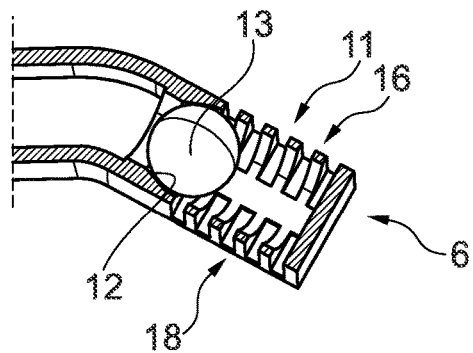

There it shows, in each case schematically,

FIG. 1 shows a sectional representation through a suction device according to the invention, FIG. 2 shows a detail view from FIG. 1 in the region of a first valve, FIG. 3 shows a detail view from FIG. 1 in the region of a second valve.

DETAILED DESCRIPTION

According to FIG. 1, a suction device 1 according to the invention, which can be arranged for example for suctioning oil in a motor vehicle 2, comprises a suction channel 3 which comprises a first suction portion 4 and a second suction portion 6 located opposite in the transverse direction 5. By way of the two suction portions 4, 6, the suction device 1, in its state mounted in the motor vehicle 2, projects into a liquid reservoir 7, for example an oil pan.

In the first suction portion 4, a first valve 8 (see also FIG. 2) with a first valve seat 9 and a moveable first valve body 10 interacting with the former is provided. In the second suction portion 6, a second valve 11 (see also FIG. 3) having a second valve seat 12 and a moveable second valve body 13 interacting with the former is provided. The two valves 8, 11 are now designed in such a manner that from a predefined transverse acceleration $a \geq a_D$ one of the two valves 8, 11 closes while the other valve 11, 8 remains open. This state is shown according to the FIGS. 1 to 3. Below this predefined transverse acceleration a, i.e. at $a<a_D$ both valves 8, 11 remain open.

Viewing FIGS. 1 to 3 it is noticeable that a transverse acceleration $a \geq a_D$ is present there, wherein the centrifugal forces that occur detach the first valve body 10 from the first valve seat 9 so that the first valve 8 is opened while the second valve body 13 is supported on the associated second valve seat 12 and closes the second valve 11.

The situation shown according to FIG. 1 occurs for example in a right-hand curve in the case of which the liquid 14, for example the oil, is forced towards the outside due to the transverse acceleration or due to the centrifugal force. A liquid level is thus higher at an outer edge 19 of the liquid reservoir 7 than at an inner edge 20, which can result in that when suctioning the liquid 14 on both sides via both suction portions 4, 6, the second suction portion 6, here the inner suction portion, would suction air, which has to be avoided at all cost. Because of the valves 8, 11 designed according to the invention it can be ensured however that from a predefined transverse acceleration $a \geq a_D$ merely the outer valve, according to FIG. 1 the first valve 8, is opened, while the second valve 11, here the inner valve, remains closed.

The first and/or second valve body 10, 13 can be formed as a sphere, as a result of which lower requirements in terms of fits and tolerances are made possible. Here, the first valve 8 is arranged in a bent first end portion 15, while the second valve 11 is arranged in a bent end portion 16 of the second suction portion 6. The bent end portions 15, 16 can be bent downwards in order to make possible a reliable suctioning of liquid 14.

In addition, a first guide cage 17 (see also FIG. 2) for guiding the first valve body 10 and for pre-filtering the liquid 14 to be suctioned is arranged on the first valve 8. Analogously to this, a second guide cage 18 for guiding the second valve body 13 and if applicable for pre-filtering the liquid 14 to be suctioned can be arranged on the second valve 11.

The suction channel 3 with the first suction portion 4 and the second suction portion 6 can be formed in one piece, in particular as a plastic injection moulding, wherein an embodiment formed as a half shell in each case is also conceivable, so that the two valve bodies 10, 13 can be inserted prior to joining the two half shells. The suction device 1 can be designed as an oil suction device, wherein obviously further embodiments are also still conceivable.

The invention claimed is:

1. A suction device, comprising:
   a suction channel including a first suction portion and a second suction portion disposed opposite one another in a transverse direction;
   a first valve arranged in the first suction portion, the first valve including a first valve seat and a moveable first valve body interacting with the first valve seat;
   a first guide cage arranged on the first valve for guiding the first valve body and pre-filtering a liquid to be suctioned;
   a second valve arranged in the second suction portion, the second valve including a second valve seat and a moveable second valve body interacting with the second valve seat;
   a second guide cage arranged on the second valve for guiding the second valve body and pre-filtering the liquid to be suctioned;
   wherein the first valve and the second valve are configured such that:
      when a transverse acceleration is equal to or greater than a predefined transverse acceleration, one of the first valve and the second valve closes while the other one of the first valve and the second valve remains open; and
      when the transverse acceleration is less than the predefined transverse acceleration, the first valve and the second valve are both open;
   wherein the first guide cage includes a first cage half and a second cage half that are connected to one another to define the first guide cage;
   wherein the first cage half includes (i) a first base body, (ii) a plurality of first ribs projecting from the first base body, and (iii) a first end wall projecting from the first base body; and
   wherein the second cage half includes (i) a second base body, (ii) a plurality of second ribs projecting from the second base body and contacting the plurality of first ribs, and (iii) a second end wall projecting from the second base body and contacting the first end wall.

2. The suction device according to claim 1, wherein:
   at least one of the first valve body and the second valve body is a sphere;
   the first valve is arranged in a bent end portion of the first suction portion; and
   the second valve is arranged in a bent end portion of the second suction portion.

3. The suction device according to claim 1, wherein the suction channel is formed in one piece with the first suction portion and the second suction portion.

4. A motor vehicle, comprising a suction device according to claim 1.

5. The motor vehicle according to claim 4, further comprising a liquid reservoir, wherein the first suction portion and the second suction portion project into the liquid reservoir.

6. A suction device, comprising:
a suction channel body defining a suction channel, the suction channel body including a first suction portion and a second suction portion disposed opposite one another in a transverse direction;
the first suction portion including:
a first guide cage having a closed end and an open end; and
a first valve including (i) a first valve seat connected to the open end of the first guide cage and (ii) a moveable first valve body disposed in the first guide cage and configured to interact with the first valve seat to seal a first end of the suction channel;
the second suction portion including:
a second guide cage having a closed end and an open end; and
a second valve including (i) a second valve seat connected to the open end of the second guide cage and (ii) a moveable second valve body disposed in the second guide cage and configured to interact with the second valve seat to seal a second end of the suction channel;
wherein the first valve and the second valve are configured such that:
when a transverse acceleration is equal to or greater than a predefined transverse acceleration, one of the first valve and the second valve closes while the other one of the first valve and the second valve remains open; and
when the transverse acceleration is less than the predefined transverse acceleration, the first valve and the second valve are both open;
wherein, via the transverse acceleration, the first valve body is movable within the first guide cage and the second valve body is movable within the second guide cage;
wherein the first guide cage includes a plurality of elongated first openings longitudinally extending transverse to a first central axis of the first valve seat;
wherein the second guide cage includes a plurality of elongated second openings longitudinally extending transverse to a second central axis of the second valve seat;
wherein the first guide cage further includes a first cage half and a second cage half that are connected to one another to define the first guide cage;
wherein the first cage half includes (i) a first base body, (ii) a plurality of first ribs projecting from the first base body, and (iii) a first end wall projecting from the first base body; and
wherein the second cage half includes (i) a second base body, (ii) a plurality of second ribs projecting from the second base body and contacting the plurality of first ribs, and (iii) a second end wall projecting from the second base body and contacting the first end wall.

7. The suction device according to claim 6, wherein:
the suction channel body further includes an intermediate portion disposed between and connecting the first suction portion and the second suction portion; and
the first suction portion and the second suction portion project transversely from the intermediate portion.

8. The suction device according to claim 6, wherein:
the first valve body is a first spherical valve body;
the first valve seat is a first spherical segment surface complimentary to the first spherical valve body;
the second valve body is a second spherical valve body; and
the second valve seat is a second spherical segment surface complimentary to the second spherical valve body.

9. The suction device according to claim 6, wherein:
the first guide cage is removably connected to the first suction portion; and
the second guide cage is removably connected to the second suction portion.

10. The suction device according to claim 6, further comprising a first-half shell and a second-half shell that are connected to one another to define the suction channel body, the first guide cage, and the second guide cage.

11. The suction device according to claim 10, wherein:
the first-half shell is a one-piece component that defines a first half of the suction channel body, the first cage half of the first guide cage, and a first cage half of the second guide cage; and
the second-half shell is a one-piece component that defines a second half of the suction channel body, the second cage half of the first guide cage, and a second cage half of the second guide cage.

12. The suction device according to claim 6, wherein:
when the transverse acceleration is in a first direction and is equal to or greater than the predefined transverse acceleration, the second valve closes while the first valve remains open; and
when the transverse acceleration is in a second direction opposite the first direction and is equal to or greater than the predefined transverse acceleration, the first valve closes while the second valve remains open.

13. A suction device, comprising:
a suction channel body defining a suction channel, the suction channel body including a first suction portion and a second suction portion disposed opposite one another in a transverse direction;
the first suction portion including a first valve, the first valve including:
a first guide cage having a closed end and an open end;
a first valve seat connected to the open end of the first guide cage; and
a moveable first valve body disposed in the first guide cage and configured to interact with the first valve seat to seal a first end of the suction channel;
the second suction portion including a second valve, the second valve including:
a second guide cage having a closed end and an open end;
a second valve seat connected to the open end of the second guide cage; and
a moveable second valve body disposed in the second guide cage and configured to interact with the second valve seat to seal a second end of the suction channel;
wherein the first valve and the second valve are configured such that:
when a transverse acceleration is less than a predefined transverse acceleration, the first valve and the second valve are both open;
when the transverse acceleration is in a first direction and is equal to or greater than the predefined transverse acceleration, (i) the second valve is closed and (ii) the first valve is open; and when the transverse acceleration is in a second direction opposite the first direction and is equal to or greater than the predefined transverse acceleration, (i) the first valve is closed and (ii) the second valve is open;

wherein the first guide cage includes a first cage half and a second cage half that are connected to one another to define the first guide cage;

wherein the first cage half includes (i) a first base body, (ii) a plurality of first ribs projecting from the first base body, and (iii) a first end wall projecting from the first base body; and wherein the second cage half includes (i) a second base body, (ii) a plurality of second ribs projecting from the second base body and contacting the plurality of first ribs, and (iii) a second end wall projecting from the second base body and contacting the first end wall.

14. The suction device according to claim 13, wherein:
the first valve body is a first spherical valve body;
the first valve seat is a first spherical segment surface complimentary to the first spherical valve body;
the second valve body is a second spherical valve body; and
the second valve seat is a second spherical segment surface complimentary to the second spherical valve body.

15. The suction device according to claim 13, wherein the first base body and the second base body are each a substantially planar body.

16. The suction device according to claim 13, wherein:
the first guide cage further includes a plurality of elongated first openings longitudinally extending transverse to a first central axis of the first valve seat; and
at least some of the plurality of elongated first openings are defined by and between the plurality of first ribs and the plurality of second ribs.

17. The suction device according to claim 13, wherein:
the first valve body is a first spherical valve body; and
the plurality of first ribs and the plurality of second ribs each have a spherical segment surface complimentary to the first spherical valve body.

18. The suction device according to claim 13, wherein:
the first cage half further includes a first intermediate protrusion projecting from the first base body and connecting the plurality of first ribs; and
the second cage half further includes a second intermediate protrusion projecting from the second base body and connecting the plurality of second ribs.

19. The suction device according to claim 18, wherein:
a first subset of the plurality of first ribs and a second subset of the plurality of first ribs are disposed on and extend from opposites sides of the first intermediate protrusion; and
a first subset of the plurality of second ribs and a second subset of the plurality of second ribs are disposed on and extend from opposites sides of the second intermediate protrusion.

20. The suction device according to claim 19, wherein:
the first subset of the plurality of first ribs and the second subset of the plurality of first ribs are disposed in alignment with one another; and
the first subset of the plurality of second ribs and the second subset of the plurality of second ribs are disposed in alignment with one another.

* * * * *